(12) United States Patent
Stafford

(10) Patent No.: US 8,326,843 B2
(45) Date of Patent: Dec. 4, 2012

(54) APPARATUS AND METHOD FOR NAVIGATING DATA USING A GRAPHICAL INTERFACE

(76) Inventor: Kieran Stafford, Sydney (AU)

( * ) Notice: Subject to any disclaimer, the term of this patent is extended or adjusted under 35 U.S.C. 154(b) by 208 days.

(21) Appl. No.: 12/936,816

(22) PCT Filed: Apr. 8, 2009

(86) PCT No.: PCT/AU2009/000419
§ 371 (c)(1),
(2), (4) Date: Oct. 7, 2010

(87) PCT Pub. No.: WO2009/124337
PCT Pub. Date: Oct. 15, 2009

(65) Prior Publication Data
US 2011/0035380 A1    Feb. 10, 2011

(30) Foreign Application Priority Data

Apr. 11, 2008  (AU) ................................ 2008901760
Aug. 4, 2008  (AU) ................................ 2008100718

(51) Int. Cl.
*G06F 17/30* (2006.01)
(52) U.S. Cl. ....................................... 707/749
(58) Field of Classification Search .................. 707/749, 707/748, 736, 705, 758, 767, 766, 765, 759, 707/999.001, 999.003
See application file for complete search history.

(56) References Cited

U.S. PATENT DOCUMENTS

| | | | |
|---|---|---|---|
| 6,041,311 A * | 3/2000 | Chislenko et al. | 705/26.7 |
| 6,674,452 B1 | 1/2004 | Kraft et al. | |
| 6,738,978 B1 * | 5/2004 | Hendricks et al. | 725/35 |
| 6,933,433 B1 | 8/2005 | Porteus et al. | |
| 2002/0075330 A1 | 6/2002 | Rosenzweig et al. | |
| 2004/0225577 A1 * | 11/2004 | Robinson | 705/26 |
| 2005/0076365 A1 * | 4/2005 | Popov et al. | 725/46 |
| 2007/0180389 A1 | 8/2007 | Holm et al. | |
| 2007/0288453 A1 | 12/2007 | Podilchuk | |
| 2008/0021851 A1 * | 1/2008 | Alcalde et al. | 706/21 |
| 2008/0134043 A1 * | 6/2008 | Georgis et al. | 715/733 |
| 2009/0158196 A1 * | 6/2009 | Crystal | 715/780 |

FOREIGN PATENT DOCUMENTS

| | | |
|---|---|---|
| WO | 0173598 A2 | 10/2001 |
| WO | 02095611 A2 | 11/2002 |
| WO | 2008034187 A1 | 3/2008 |

* cited by examiner

*Primary Examiner* — Amresh Singh
(74) *Attorney, Agent, or Firm* — Levine & Mandelbaum

(57) ABSTRACT

A computer-implemented graphical apparatus and method for navigating a collection of data such as a database by exploring or drilling down through a database without needing to enter a text-based keyword search; and navigating a database using a graphical interface that presents structured options to users rather than relying on user knowledge to direct the navigation process.

7 Claims, 4 Drawing Sheets

APPARATUS AND METHOD FOR NAVIGATING DATA USING A GRAPHICAL INTERFACE

INTRODUCTION

The present invention relates to a means for navigating data and in particular to a computer-implemented graphical means for navigating a collection of data such as a database. The invention provides a means for a user to:

(a) explore or drill down through a database without needing to enter a text-based keyword search; and (b) navigate a database using a graphical interface that presents structured options to users rather than relying on user knowledge to direct the navigation process.

The invention has been developed primarily for use as a new or improved graphical means for exploring a comprehensive hierarchical music library, and has been designed for use by consumers and in business such as by hospitality, retail and other commercial providers where the playing of selected music is desirable. However, it will be appreciated that the invention is not restricted this particular field of use.

PROBLEMS OF THE PRIOR ART

Current means for navigating a collection of data, whether it be a database or any other repository of information, typically require a user to type key word search terms into a search engine. The main problem with this approach is that it relies on user knowledge and on user skill in conducting searches. Therefore, the results of these kinds of searches often suffer the following disadvantages:

(a) if the user has limited knowledge of the subject area, the search may bring up a large number of irrelevant results or fail to find relevant material;

(b) if the search is framed too broadly, the volume of material found may be overwhelmingly large to review;

(c) the effort involved in navigating or drilling down into the data can be significant, so the user's level of satisfaction from the search is often dependent on the amount of time the user is able to dedicate to the task of searching and trawling through the results or exploring new tangents raised by the search results.

Another traditional means for a user to navigate a data collection is to browse the collection. The disadvantages of this method include:

(a) browsing a large data collection can be very time consuming and therefore the ability for users to find what they are looking for can be limited;

(b) it can be difficult to locate relevant material by browsing and to relocate it.

Take, by way of example, a collection of digitised music. Many consumers have built a collection of digital music files. With digital music collections, many consumers do not catalogue or tag their files at all, resulting in potentially vast collections of digital files without the means to sort through them—other than to add files to a favourite playlist, which becomes as unmanageable as the remainder of the collection once it reaches a certain size. In a commercial setting, this is inadequate, particularly if music is an important component of the commercial environment (e.g. in a shop, restaurant or cocktail lounge).

Many consumers are frustrated by the inability to have a large selection of music available at their fingertips, to listen to on demand. Many businesses cannot dedicate the resources to build and catalogue a music collection or spend the time listening to music to determine its appropriateness for inclusion in their collection. Consequently, many business (and individuals) end up having a "safe" but limited collection, or rely on radio or a piped background music service.

OBJECT OF THE INVENTION

It is an object of the present invention to overcome or ameliorate at least one of the disadvantages of the prior art, or to provide a useful alternative. In particular, the present invention provides a new or alternative computer-implemented system, method and apparatus for consumers or business to navigate data without the need to rely solely on key word searching of the data.

According to the invention there is provided a computer-implemented method for navigating a data collection such as a collection of digitised music files including the steps of:

(a) analysing metadata regarding each of a plurality of data files in a data collection;

(b) calculating correlations between said metadata to sort data files such that said data files are sorted into one or more categories based on said correlations between respective metadata;

(c) calculating correlations between said categories to enable ranking of said categories by degree of relative correlation such that a relationship between said categories is defined;

(d) providing a graphical representation of said data collection and of said categories of data files within said data collection such that a viewer is enabled to view at least a part of said data collection;

(e) associating an action involving said graphical representation or a part thereof with a function such that performing said action on said graphical representation or a relevant part thereof results in performing said function on:
  i. a corresponding said category;
  ii. a corresponding said data file;
  iii. any combination of the above,
  wherein the method enables:
  A. navigation of a data collection by relying on correlations between metadata for each data file in a data collection and correlations between categories of data file; and
  B. performing one or more functions on a data collection by performing an action on a graphic representation of the corresponding respective part of the data collection.

According to another aspect of the invention there is provided a computer-implemented apparatus for navigating a data collection such as a collection of digitised music files including:

(a) means for analysing metadata regarding each of a plurality of data files in a data collection;

(b) means for calculating correlations between said metadata to sort data files such that said data files are sorted into one or more categories based on said correlations between respective metadata;

(c) means for calculating correlations between said categories to enable ranking of said categories by degree of relative correlation such that a relationship between said categories is defined;

(d) a graphical representation of said data collection and of said categories of data files within said data collection such that a viewer is enabled to view at least a part of said data collection;

(e) means for associating an action involving said graphical representation or a part thereof with a function such that performing said action on said graphical representation or a relevant part thereof results in performing said function on:

i. a corresponding said category;
ii. a corresponding said data file;
iii. any combination of the above,
wherein the apparatus enables:

A. navigation of a data collection using correlations between metadata for each data file in a data collection and correlations between categories of data file; and B. performing one or more functions on a data collection by performing an action on a graphic representation of the corresponding respective part of the data collection.

BRIEF DESCRIPTION OF THE DRAWINGS

A preferred embodiment of the invention will now be described, by way of example only, with reference to the accompanying drawings in which.

DETAILED DESCRIPTION

Figure 1:
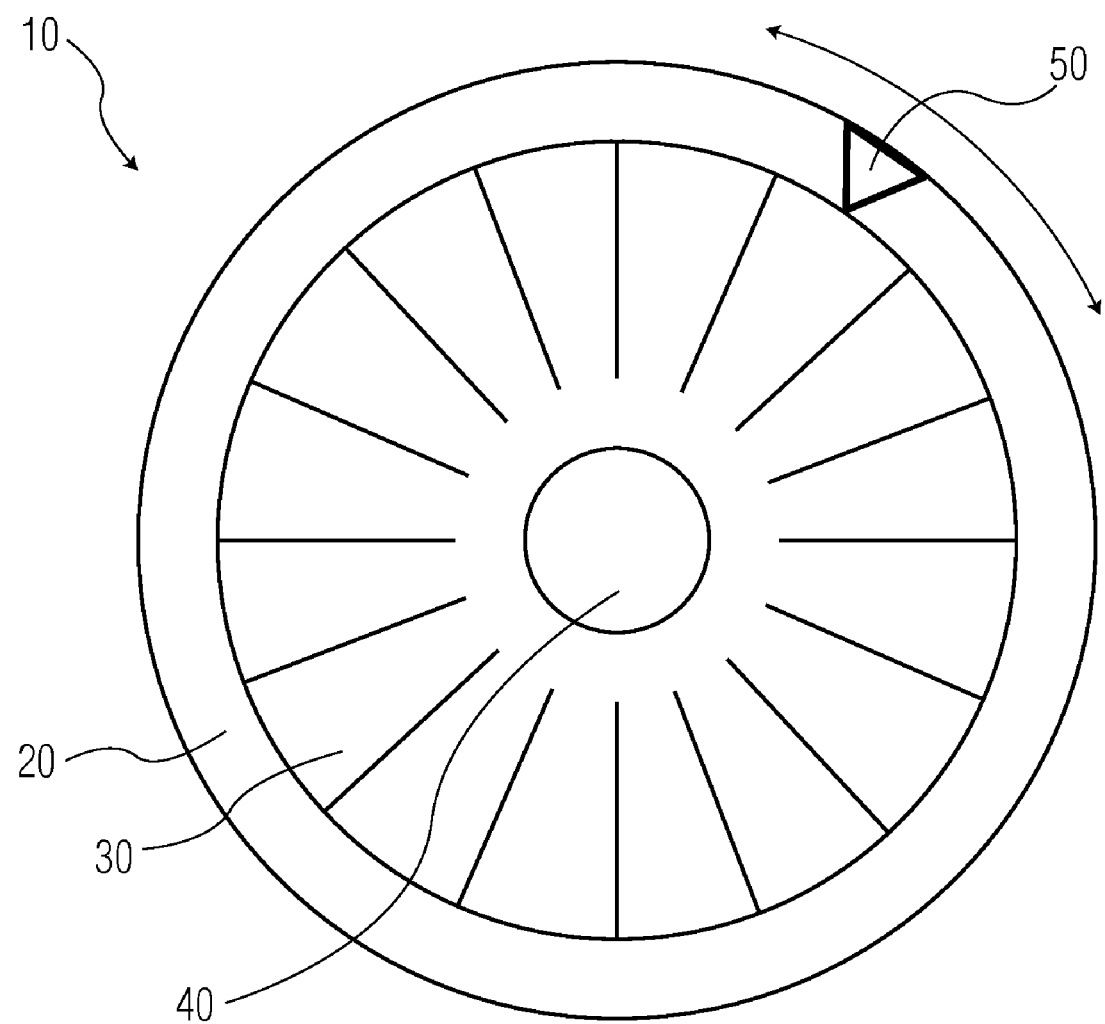
FIG. 1 is a schematic representation of a navigation tool in the preferred embodiment, used to navigate a first tier of data in a hierarchical data collection.

The following detailed description in conjunction with the figures provides the skilled addressee with an understanding of the invention. It will be appreciated, however, that the invention is not limited to the applications described below.

SUMMARY OF THE INVENTION

The present invention provides a graphical computer-implemented means for navigating a data collection. The invention provides a navigation tool for exploring a data collection and revealing relationships between data, without relying on key word searching and user knowledge of the data subject area. In this way, the invention is also a new or useful alternative to a catalogue and to a search engine for selecting data from a comprehensive data collection.

In a preferred embodiment also provides a new or alternative system, method and apparatus for consumers or business to access music, including:

(a) a comprehensive music collection;

(b) apparatus for delivering music from the music collection to the user, on demand, including means for creating a music compilation to meet a user's music choices;

(c) a graphical user interface that enables a user to browse the collection and to perform deep searches of the data collection without the need to type in a search term.

Alternative embodiments provide a system, method and apparatus for navigating, say, a collection of wine, cheese, menus, film, sounds, still images, perfumes or any other grouping of objects that can be classified. The invention enables recall or selection of an object from within a collection without the use of keyword searching or prior knowledge of classification (ranking) criteria.

In this document, the term "object" includes:
(a) a sound, for example, a musical piece;
(b) an image, for example, a picture, still image or film clip;
(c) a texture, for example, a gritty surface or a silky finish;
(d) a smell, for example, a perfume or aroma;
(e) a taste, such as a bitter taste or a taste associated with a particular cheese or wine; and/or
(f) a combination of the above;

ADVANTAGES OF THE PRESENT INVENTION

The invention is a new or useful alternative to a traditional catalogue and to a traditional search engine, both of which suffer the disadvantage of requiring at least minimal user knowledge of the subject area to get meaningful data out of a comprehensive data collection. Further the present invention presents relationships to a user, which enables the invention to be used as a teaching aid or educational tool.

This is because users do not need to have knowledge of the data subject area to make selections from a comprehensive collection of data—in the preferred embodiment, the invention is applied to a music collection. Alternative embodiments include collections of images (still and moving), collections of artwork, and collections of stories, or any other reference collection. The invention is particularly suited to data that can be categorised into major groups and then sorted according to time. Examples include:

(a) archives of material (including images) for individual events such as the Melbourne Cup, Commonwealth Games, World Cup, Olympics and so on; or (b) library catalogues.

The invention enables a user's selection to be made by using a navigation tool (e.g. a graphic representation of tool such as a dial, wheel or slider) to:

(a) select a first broad category (tier) of data;

(b) refine the search according to time (a second tier of data);

(c) further narrow the selected data according to pre-determined sub-categories of the first tier of broad category (a third tier of data);

(d) drill more deeply into a data collection by selecting fourth and subsequent tiers of data, if desired.

This confines the number of steps required by a user to make a selection and simplifies the task of performing a search, while still relying on sophisticated querying of the underlying database. It also opens the opportunity for users to explore the database freely (by browsing genres or sub-genres) and to stumble across music that they do not know, without the need to have knowledge of the artist or of a specific track or title.

The invention has been developed primarily for use as a system, method and device for accessing a music collection; however, it should be appreciated by those skilled within the art that the invention is not restricted to this particular field of use. For example, the invention can be applied to any of the arts such as painting, photography, video, film, poetry, books, and other arts (or catalogues of such subject matter) that are able to be communicated over a networked computer or radio broadcast system.

The elements of the invention are now described under the following headings.

An Exemplary Preferred Embodiment: a Navigation Tool

In a first exemplary preferred embodiment, the invention is a tool for navigating or exploring a digitised music content database. The navigation tool illustrated schematically in FIG. 1 enables a user to select (and browse) a first tier of data. This tier includes broad groups of data. In the music database example, this equates to broad genres of music such as "classical", "jazz", "rock". The user only needs to have very basic knowledge of music styles to enter the database (that is to gain access to the database) and to navigate between these broad categories in a first tier.

Referring to FIG. 1, the preferred embodiment provides a series of graphical representations displayed on a computer screen (or other digital display means such as a digital panel), which are enabled to be manipulated by a user. Using the navigation tool depicted in FIG. 1, a user is enabled to browse broad groups of data within a data collection. In the preferred embodiment, the data collection is depicted on a computer screen or other display means as a wheel 20 that is segmented into groups of data (labelled 30). The data collection in the preferred embodiment could as easily be depicted using a slider, button, dial or other graphical representation.

A user navigates from one data group 30 to another within the data collection (such as a database) by turning the navigation tool 10 around the wheel 20 in a clockwise or counterclockwise direction. The user makes a selection by turning the navigational tool 10 until the desired data group 30 meets the selection indicator 50. In this example, each data group 30 is a different genre of music. The user's choice is locked in by pressing a locking means, such as a button 40 in the centre of the wheel 20, when the desired data group 30 (say the genre "jazz") is adjacent to the selection indicator 50.

Once the user selects the desired data group 30 (genre) in a first tier of data, the user is then enabled to navigate a second tier of data in the data collection. The graphical representations presented to the user change to reflect the shift from one tier of data to another.

Time Selection Tool

Figure 2:
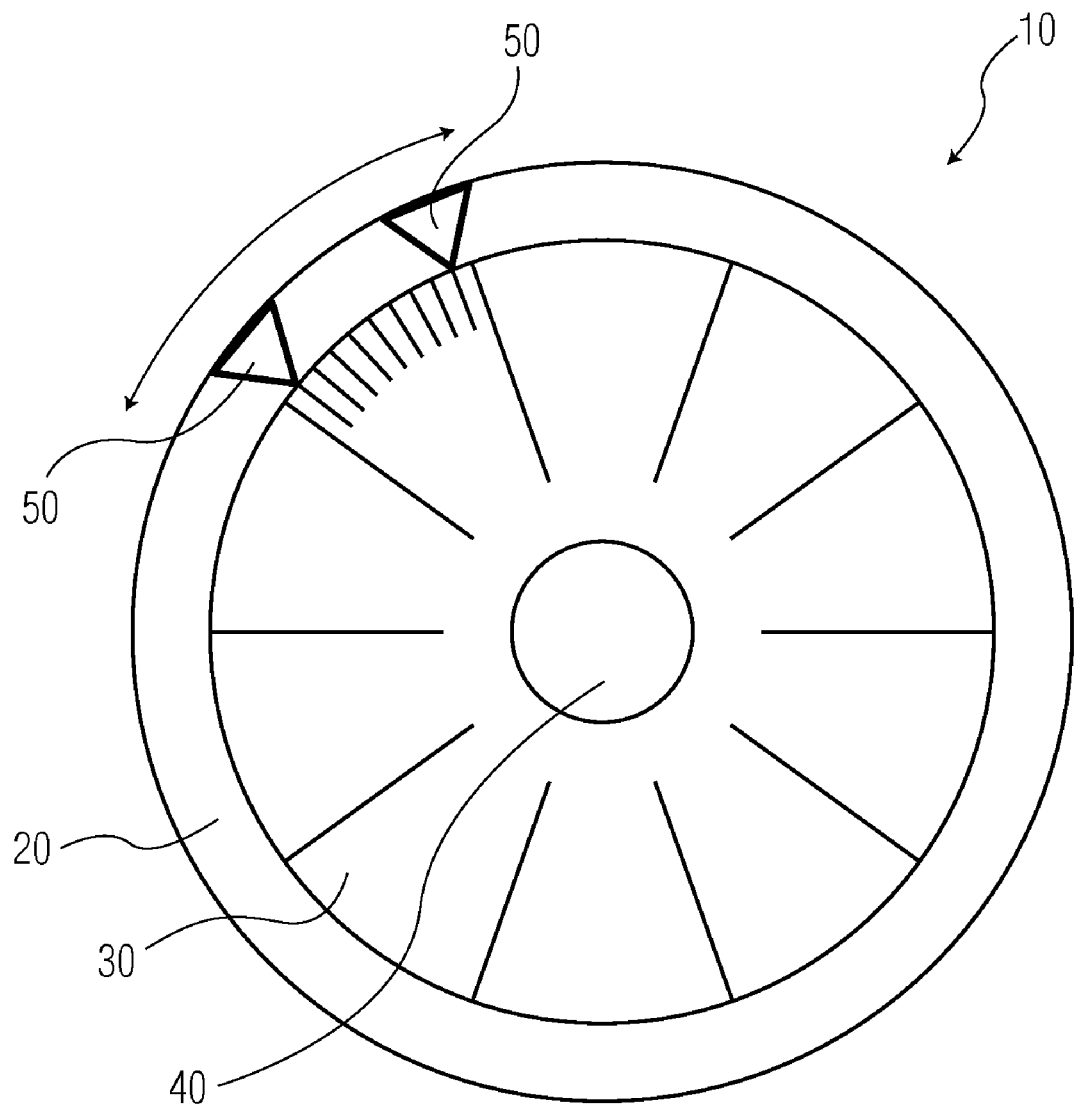
FIG. 2 is a schematic representation of the navigation tool in FIG. 1 adapted to navigate a second tier of data.

Referring now to FIG. 2, the wheel 20 represents an epoch of time—say, the twentieth century. The user employs similar techniques for making a selection of data in a second tier as for making a selection of data in a first tier; namely, the user rotates the navigation tool 10 around the wheel 20 until the desired data group is adjacent to a selection indicator 50. The difference now is that two selection indicators 50 are present, enabling a user to select a range of data within a data group 30.

In our music database example, each data group 30 in FIG. 2 represents a different time period. The user selects a time period by moving a first selection indicator 50 to a starting point in time and a second selection indicator 50 to a finishing point in time. In the example shown in FIG. 2, the years 1951 to 1959 are chosen. At this point, the user has navigated the music database to find "jazz" from the period "1951" to "1959".

The user locks in his or her selection of a time period by pressing the central button 40. This step then enables a user to be presented with a further tier of data.

Narrowing the Search

The user is enabled to further narrow the search of the data collection without typing in key words—it is this and deeper levels of searching that are often not available to ordinary consumers with limited knowledge of the subject area.

Figure 3:
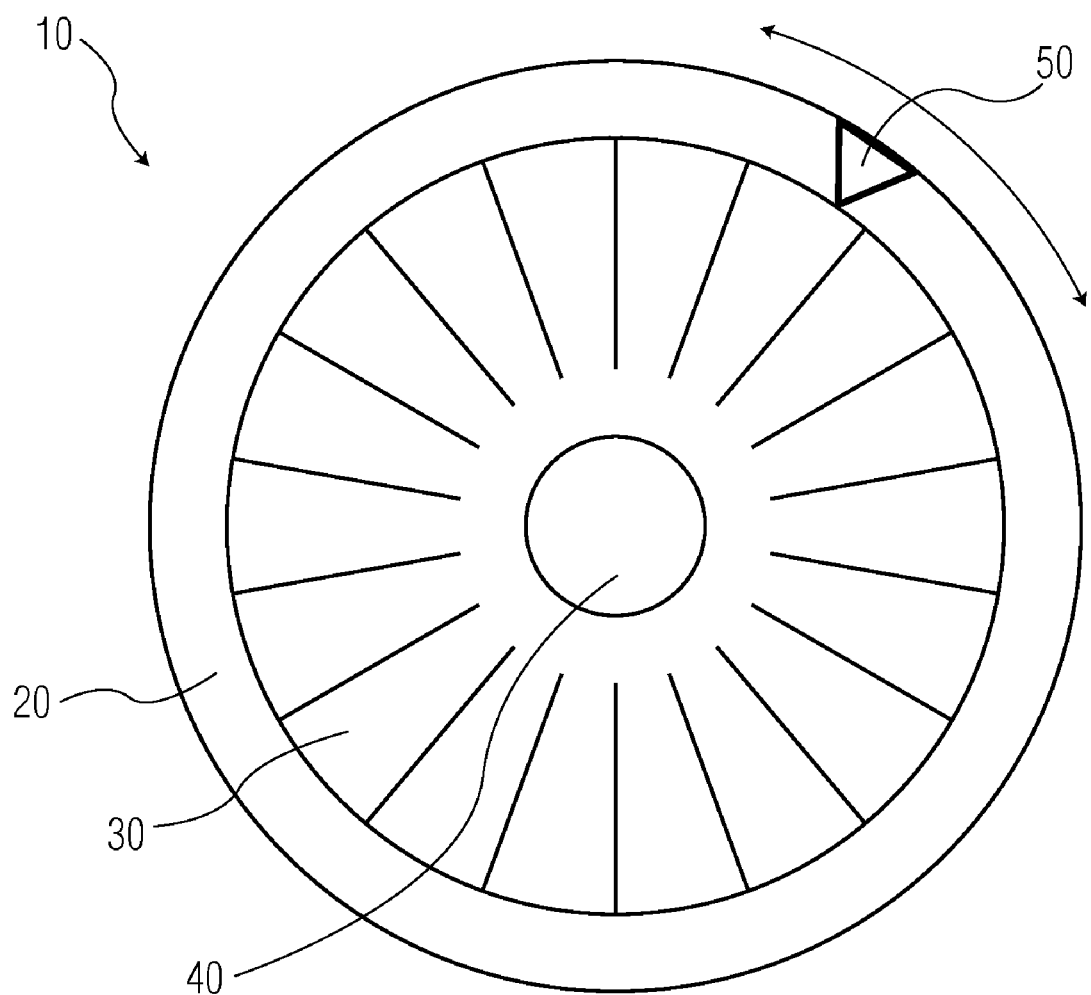
FIG. 3 is a schematic representation of the navigation tool in FIG. 1, adapted to navigate a third tier of data.

Referring to FIG. 3, the navigation tool 10 is similar to the navigation tool depicted in FIG. 1. In FIG. 3, however, the wheel 20 represents the genre of music earlier selected by the user. So while "jazz" represented a single segment of the wheel 20 in FIG. 1, the entire wheel 20 in FIG. 2 now represents the genre "jazz". Each segment 30 is a different microgenre such as "swing", "free", "cool", "dixieland" and so on. The data groups (microgenres) presented to the user are determined by the user's earlier selections. For example, if our user's earlier choices had been "jazz" between "1930 and 1940", the microgenre selection would not include "free" jazz because there was no free jazz in the 1940s.

Deep Drilling of the Data Collection

Figure 4:
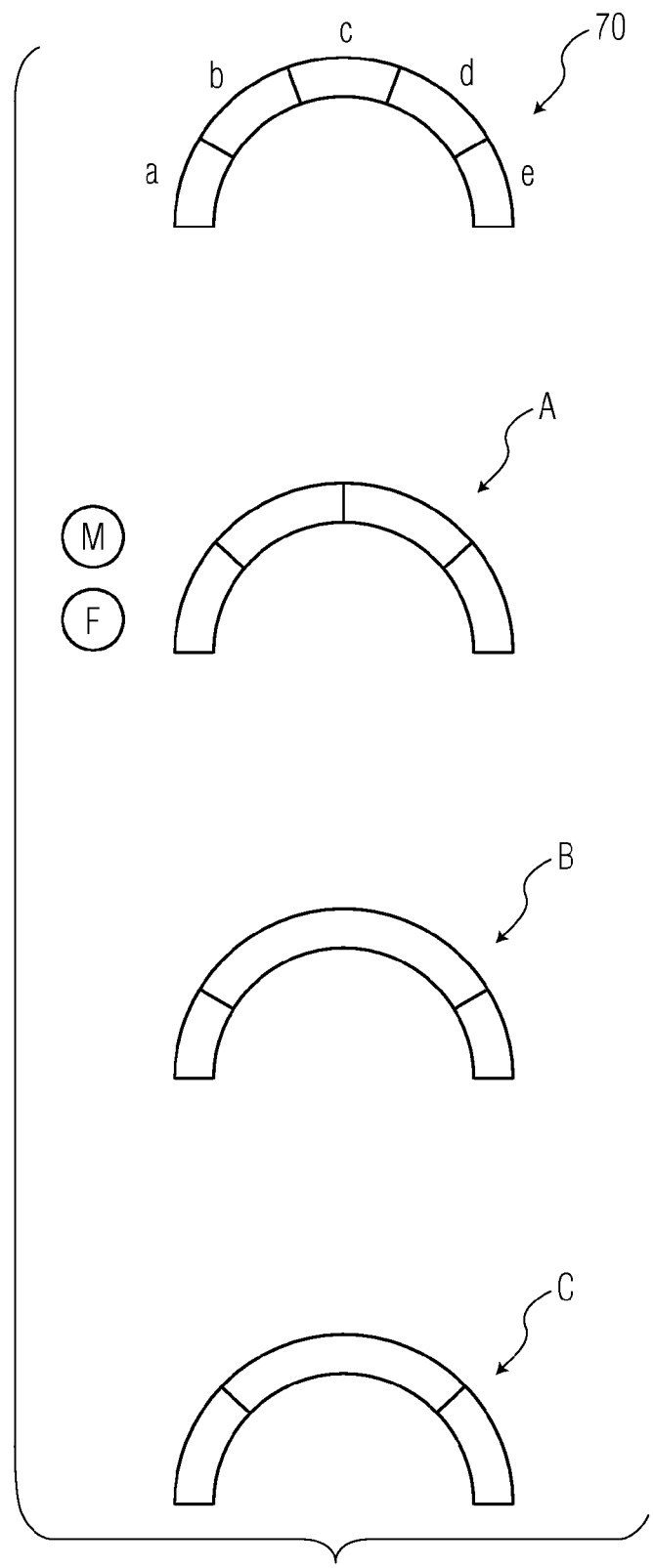
FIG. 4 is a schematic representation of a graphical navigation tool according to the preferred embodiment illustrated in the preceding Figures. Using this tool, a user is enabled to select options for drilling down into a fourth or subsequent tier of data. However, users are not required to drill down multiple tiers of data in order to use the navigational tool of the preferred embodiment.

A user is presented with further navigation tools to drill down more deeply into the data collection; examples of these tools are shown schematically in FIG. 4. For example, at the top of FIG. 4 is an "instruments" selection scale 70. The user can use the scale 70 to select between, for example:

(a) solo;
(b) duo;
(c) trio;
(d) quartet +;
(e) big band

Other selection tools illustrated in FIG. 4 enable the user to select:

(a) Vocal: "male/female/any" and then "solo", "duet", "group", "choir"
(b) Emotive tone of the music: cool to hot
(c) Speed or tempo of the music: ballad to fast dance.

Users can also make a selection according to the geographical source (location) of the music (not illustrated). The graphical representation of the selection tool in this case might be a map or other icon to represent location.

These further selection tools enable a user to drill deeply and build a detailed navigation path through a data collection without needing to have specialist knowledge. The tools, as illustrated schematically in the Figures, are graphic elements (termed graphical representations) that the user can use without needing to type in words or to make selections from long "contents" lists. It will be appreciated by those skilled in the art that the tools are not restricted to the graphical representations illustrated (that is, wheels and scales) but could be represented by any graphical representation that enables a user to browse from one category to another and to lock in multiple selection criteria.

Educational Tool

One advantage of the preferred embodiment as described above is that it provides a user with a means for a user to explore a data collection within broad parameters, without overwhelming the user with long lists of choices or requiring the user to type in key words (which requires some knowledge of the subject area).

For example, a key word search for similar music as located by the navigation tool described in the steps above would require a user to type in queries along the following lines:

(a) "free jazz from 1950 to 1959";
(b) "free jazz from the 1950s";
(c) "free jazz and 1950s";
(d) "free jazz and fifties".

Musical novices or young learners are likely to be unaware of "free jazz" and of when it first appeared on the music scene; they are equally unlikely to stumble across this style of music from this era or, if they did, would be unlikely to be able to date the music back to the correct time period or know where the music fits in the context of various genres of music. In this way, the preferred embodiment is a useful educational tool for exploring musical genres. The significance of the preferred embodiment as an educational tool is perhaps better appreciated with avant garde or alternative genres or narrow microgenres of music, which a user might never otherwise be exposed to if searching using key word searches.

The preferred embodiment provides a means for a user to browse from category to category in at least a first tier of data, and to progressively narrow the data category with each tier of data added to the exploration path. In the music collection example, the user need not have any knowledge of different music styles. In this way, the preferred embodiment provides an educational tool for a user to explore relationships between data (different styles of music) without the need for any knowledge of the subject area.

Music Content Database

The present invention also provides consumer access to a comprehensive music collection, which is a collection of digital music files such as a music database. Each file is indexed (tagged, metatagged) in a manner that enables users to:

(a) browse the database or a section of it; and/or (b) conduct sophisticated searches of the database, if desired (by drilling deep into the data collection using the tools provided).

In the preferred embodiment, the database includes around 25 main genres of music, which are subdivided into a further 700 micro-genres. Each music track is identified by approximately 16 metadata tags, including composer, artist and title. In the preferred embodiment, the navigational tool utilises metadata tags and combination of tags to categorise music tracks and to enable browsing, sorting and selection of music by users.

The data collection is collated from material obtained from the copyright owner or with the copyright owner's authority, eliminating contamination by incomplete or poor quality recordings or tracks. The database is continuously updated, resulting in access to an ever increasing collection of music.

The advantage of providing a music collection in the preferred embodiment is that currently, the majority of ordinary consumers choose music by their acquired musical taste and experience (what they have heard before, artists they know), word of mouth recommendation, music reviews, what they are exposed to through the media (popular music) and simply by asking when they hear music they like (e.g. in a club, at an event or in a music store). This is time consuming and limiting because consumers need to acquire knowledge in order to broaden their collection of music. For business, it also represents a significant investment of time and other resources.

Many consumers are frustrated by the inability to have a large selection of music available at their fingertips, to listen to on demand. Many businesses cannot dedicate the resources to build and catalogue a music collection or spend the time listening to music to determine its appropriateness for inclusion in their collection. Consequently, many business (and individuals) end up having a "safe" but limited collection, or rely on radio or a piped background music service.

With digital music collections, many consumers do not catalogue or tag their files at all, resulting in potentially vast collections of digital files without the means to sort through them—other than to add files to a favourite playlist, which becomes as unmanageable as the remainder of the collection once it reaches a certain size. In a commercial setting, this is inadequate, particularly if music is an important component of the commercial environment (e.g. in a shop or restaurant).

There is no known product available that simplifies this task for consumers by providing a music content player system that interacts with a digitised music content data collection, including:

(a) a comprehensive music collection;

(b) apparatus for delivering from the music collection to the user, such as through data streaming technology;

(c) a user interface that enables user selection of music according to tiers of data such as genre, timeline, microgenre, instrumental, vocal, emotive then speed or tempo.

Data Content Delivery Means

The data content player means of the present invention delivers the desired data (as selected by the user) from a data collection to the user. In a preferred embodiment, the music content database of the present invention interacts with data streaming technology, to deliver the selected music to the user. The music is delivered to the user using streaming technology, which can be accessed using any protocol that can deliver streamed files over the internet. Music is streamed to overcome the problem of delay that occurs when music is downloaded and to minimise computing resources required to operate the invention.

The user interface of the present invention works across all Internet protocols such as TCP/IP, file transfer means such as FTP, radio transmissions and mobile phone applications, and is not limited to any specific protocol. This enables users to access the invention from a number of locations, and does not limit them to using the invention in one particular location, or to 'carting around' apparatus in order to access their music collection from different locations.

The inventive system and method includes tracking software that tracks a user's individual musical preferences. This enables the system to deliver to the user increased choices that match the user's individual musical taste. Therefore, if the user commonly searches for "cool jazz", the system will actively deliver more titles in this genre to the user than, say, to a user who only listens to "rock" and "1970s".

The present invention has unlimited scalability, enabling it to be used by individuals or by collections of individuals across the globe.

Method for Navigating a Data Collection

The present invention enables a user to select music by genre (or to drill down to select by sub-genre, including by epochs). The user's selections are made through a user interface that enables querying of a comprehensive music database, without relying on sophisticated music knowledge. The inventive system and apparatus deliver music that fits the user's selection criteria. The music is delivered to the user using streaming technology. Therefore, the present invention is not confined to use in a single location.

The preferred embodiment provides a means for a user to select music from a music database, including the steps of:

(a) selecting a genre: the user uses the navigation tool of the preferred embodiment (depicted schematically in FIG. 1) to select a genre, e.g. Blues, Jazz, Rock, Country, etc. The user selects the genre by rotating the wheel until it reaches the user's selection (in this example, the selected genre is "jazz"). The wheel spins in response to mouse movements or to key input. Once the relevant genre is selected, the view expands (becomes magnified) to enable the user to read the text before locking in the selection.

(b) selecting a period in time: the wheel shown in FIG. 2 is the timeline selection tool. Once a genre is selected, the wheel represents the time range of tracks in that genre. Years in that range are shown when the wheel is moved. A user rotates the wheel to select an appropriate start date and finish date (e.g. from 1960 to 1969). When the user has selected the desired time range, he or she locks in the selection and a song corresponding to the point chosen in the chronology plays. Users have taken two steps to reach this point: selecting a genre and then selecting a time period (epoch).

(c) selecting a micro-genre: the preferred embodiment enables users to select a micro-genre (e.g. "cool jazz") to drill down to a narrower range or more specific style of music. Alternatively, users can select "all" at this point. If they select "all", the preferred embodiment will play a random selection of 1960s jazz. If they select "avant-garde" the preferred embodiment will only play that style of 1960s jazz (assuming that the 1960s is still the selected time period).

The player interacts with the database in a unique way due to the architecture of the database. Users are drawn into a "push-pull" streaming model where they make a limited number of choices in order to access a comprehensive range of self-selecting tracks from the database.

Method for Selecting a Second or Subsequent Tier of Data

Referring to FIG. 3, a genre of music, in this case "jazz", has already been selected using a the navigation tool depicted in FIG. 1, as has a time period (say the 1960s). When this is done, a range of micro-genres is presented to the user—for example, as follows:

(a) Cool;
(b) Hard Bop;
(c) Free (default selection);
(d) Vocal;
(e) Soul Jazz
(f) All.

A user can use the dial (or a button, slider or other graphical representation—a dial is used for ease of description and may be substituted for any other graphical representation) to select the desired micro-genre. Again, when the user hones in to make a choice, the text is magnified or expands for ease of use.

The preferred embodiment also includes a graphic representation (e.g. a map) of selection tools for users to further refine the selection of music. Examples include instruments, vocals, emotive "flavour" or speed of the track, as well as geographic origin. For example, users may select music from "Memphis" or "Detroit". Selecting either of these locations for a micro-genre of "soul", for example, at a particular period of time can provide the listener with a very different and uniquely particular feel of, say, soul music.

Track Selection Display

The artist and title of the track selected (playing) is displayed on the screen. This track selection display can be used to reveal the previous tracks played, sorted by artist name, playing order or some other selection criteria. It can also be used to display tracks scheduled to be played.

In practice, the user may:

(a) have the genre and period of the music pre-selected so they just select the URL of the music content database provider or start the music content player application of the present invention; or (b) make the selections using the method described above—dial a genre, select a time period, and choose a micro-genre. This results in, for example, the track playing by the artist "Chick Corea" with the track tilted "Song of the Wind", followed by other tracks that meet the user's selection criteria.

Track Compilation Means

The present invention provides a data compilation means (in this example, a means for automatically compiling a number of musical tracks), which utilises the track metadata to determine the order of tracks in each listening session. Each track has a significant amount of metadata associated with it, including:

(a) information readily available from the record company database, including the name of the artist, track title, composer, and record company; and (b) additional information such as genre and micro-genre, period of release, location of release, and other details. For example, the same title may be included in the music content database of the preferred embodiment a number of times, each time indexed according to a different date of re-recording, such as 1961, 1962 and 1971, resulting in different music styles within a single sub-genre.

Additional pieces of information indexed against a track (i.e. included in the track metadata) include the style of music, band size (e.g. trio, quartet), where the band hails from (e.g. America, Boston; or Australia, Sydney) and various other pieces of information. This results in a fine grain classification of tracks instead of having, say, the three or so very broad genres of music like jazz, rock and blues. In the preferred embodiment, there are 700 sub-genres and mini genres (divisions of sub-genres) so the user can drill down to each track and find the closest relationship between the track playing and determination of the next track to be played.

In this way, the preferred embodiment provides a system, method and apparatus for like tracks to be linked, using detailed track metadata. The inventive music content player system is set up to play tracks that fall within the criteria chosen by the user. For example, once a user has made the relevant choices (e.g. "jazz" from "1963 to 1963" then "cool jazz", from "USA"), the preferred embodiment will find all tracks within the music content database that meet these criteria. The track with the closest match of metadata to the current track playing will be played next; however, if there are two or more tracks with an equally close match then the next track chosen will be:

(a) a random selection process, keeping the music flow interesting and unexpected;

(b) automatically sequenced according to metadata and business rules relating to metadata; or (c) a user's personal preference, guided by previous track play or further fine-tuning by the user of a preferred track order or compilation.

The preferred embodiment provides a means to automatically create a track compilation to meet a user's music choices. The user does not need to select the order of tracks or to arrange tracks in a particular order. The preferred embodiment enables the order of tracks to be randomly allocated, or to be determined according to the degree of match between metadata. This involves a comparison of the metadata for any number of tracks, and a "scoring" of tracks according to a common metadata set. For example, say there are 17 individual metadata associated with any given track that comes up within a user's selection of "jazz" from "1963" then "cool jazz", from "USA". The tracks with the largest number of matching metadata (say, 14 to 16 of the criteria such as genre, time, sub-genre, location and so on) will be given the highest "score". This results in these tracks being given a higher priority for play—in other words, these tracks will be played in close sequence to each other, in descending order of their score.

The scores can be underlined or superimposed with business rules, which determine the priority of identical tracks with the same "score" and also allow for play of, say, one instrumental track followed by two vocals or other similar rulings. When an overall style is selected such as "jazz" and "1960 to 1969" then the preferred embodiment plays everything that fits in such broad criteria except when underlying rules are chosen.

The preferred embodiment also enables a user to build his or her own music compilations, by the user setting the priority of play or determining business rules according to their own listening preferences (e.g. no more than three vocals in a row).

An alternative embodiment of the present invention enables database selections of other art forms such as paintings, photography, video, film, poetry, books, and other arts that are able to be communicated over a networked computer or radio broadcast system.

Means to Promote New Artists and Art Forms

The preferred embodiment provides a new or alternative means to promote new artists through the inclusion of new releases in the music content database, such as new jazz tracks that have been pressed in, say, Sydney in the last month. The system interacts with a website or other media to co-promote new tracks to users who want the "gig" live. Promotion of the venue or other advertising is also enabled as shown in FIGS. 1 and 2 in the caption "branding". Therefore, a micro-genre can be selected by "new release" instead of time.

An embodiment of the invention can deliver music video, including clippage of the artist(s) performing live, independent music video and so on. In this way, the artist is enabled to provide their own visual displays to coincide with the music tracks that they provide, so an artist is not restricted to providing an art form only within the one medium such as music, but may, alternatively provide a music video, for example, for the launch of an album or track.

A Data Distribution Gateway

The preferred embodiment provides a data distribution gateway for data such as music, and is particularly useful for independent or "off-label" recordings. A party, such as an independent record company in Poland, say, can increase its distribution of records through a gateway into the music content database of the present invention. The gateway requires detailed metadata to be provided by the record company with every music track, prior to the music going "live" (that is, being accessible to users) on the database. This is to ensure the integrity of the database and of the system, since the ability to access tracks and to build compilations depends on the quality of the metadata.

In contrast to the retrospective selection of genre, the preferred embodiment also enables current releases of music to be compared with previous genres, to give an indication of current and future music directions, by location or other criteria. For example, in the early 1970s the punk movement evolved with strong undercurrents to influence music and socionomic direction.

In this way, the preferred embodiment provides a "channel" or medium for any chosen music genre, including, if desired, a new release channel specifically, for example, for Australian jazz, blues or country music. This can be further broken down to locally-based jazz, so the user can select music available tonight in the various venues around Sydney. This promotes momentum to get people to attend and also allows the monitoring of sub-genre activity and momentum in the arena.

In the field of socionomics, music is considered a good indicator of collective social mood. Collective mood changes in the market affect indexes such as share market indexes. The preferred embodiment provides an indicator of market mood because it enables tracking of music trends over time and correlations to be drawn with other indicators, such as share market activity or real property prices. No known music library or other database can perform this function. This is particularly important where world economics is currently changing in the sense that Australia may no longer be linked to the USA and therefore there may be stronger and more divergent music trends evolving. Consequently, the preferred embodiment is a useful data collection, comparison and forecast means.

Although the invention has been described with reference to specific examples, it will be appreciated by those skilled in the art that the invention may be embodied in many different other forms.

What is claimed is:

1. A computer-implemented method for making a data collection navigable by a user as a function of correlations between a plurality of metadata for each data file in said data collection and categories of said data files, wherein the computer-implemented method is configured to perform one or more functions on said data collection by performing an action on a graphic representation of a corresponding respective part of said data collection including the steps of organizing said database for use by said user by:
   (a) analysing metadata regarding each of a plurality of data files in a data collection;
   (b) calculating correlations between said metadata of each of said data files and said categories;
   (c) for each one of a plurality of said categories, providing a graphical representation of the data files in said data collection grouped by values of said categories;
   (d) associating an action involving said graphical representation or a part thereof with a selection function such that selecting one or more values of a category on said graphical representation results in said graphical representation corresponding to a tier of said data collection including only said data files having said selected category values, whereby said selection function is repeatable for causing said graphical representation to correspond to another tier of said data collection narrower than a previous tier;
   said data collection thereafter, being navigable by a user narrowing the number of data files in said graphical representation in accordance with the category values selected by the user.

2. A computer-implemented method according to claim 1, including the further steps of:
   (a) identifying a baseline from which navigation of said data collection commences, said baseline including a data file selected from said data collection;
   (b) calculating a correlation between said baseline and other data files within said data collection;
   (c) calculating a correlation between said baseline and other categories within said data collection;
   (d) providing a data file or category selection based on said respective correlations such that said selection has a relationship with said baseline;
   (e) providing a graphical representation of said data collection;
   (f) associating a portion of said graphical representation with said selection and associating an action involving said portion of the graphical representation with a function involving the corresponding selection such that said function can be performed by performing a respective action on a corresponding portion of said graphical representation,
   said method enabling a first and subsequent selection from a data collection, each selection having a relationship with a preceding selection and being made by performing an action on the relevant corresponding portion of a graphic representation of the data collection.

3. A computer-implemented method according to claim 2 including the further steps of:
   (a) analysing metadata regarding a data file selected in a first selection;
   (b) calculating a correlation between said metadata and metadata regarding other data files in said data collection such that said other data files are sorted according to a degree of correlation between respective data files;
   (c) providing a subsequent selection of said other data files based on substantial concordance between said metadata regarding said other data files and said metadata regarding said data file in said first selection; wherein the method enables refinement of a subsequent selection based on a preceding selection.

4. A computer-implemented method according to claim 1 including the further steps of:
   (a) analysing metadata regarding a data file selected in a first selection;

(b) calculating a correlation between said metadata and metadata regarding other data files in said data collection such that said other data files are sorted according to a degree of correlation between respective data files;

(c) providing a subsequent selection of said other data files based on substantial concordance between said metadata regarding said other data files and said metadata regarding said data file in said first selection; wherein the method provides for refinement of a subsequent selection based on a preceding selection.

5. Apparatus for navigating a data collection as a function of correlations between metadata for each data file in a data collection and correlations with categories of said data files, and performing one or more functions on said data collection by performing an action on a graphic representation of a corresponding respective part of the data collection including a computer having a non-transitory storage medium embodying a computer program for:

(a) analysing metadata regarding each of a plurality of data files in a data collection;

(b) calculating correlations between said metadata of each of said data files and said categories; and (c) calculating correlations between said categories for ranking values of said categories by degree of relative correlation such that a relationship between said values of said categories is defined;

a digital display for presenting, for each one of a plurality of said categories, a graphical representation of the data files in said data collection grouped by values of said categories; and (e) a navigation tool for associating an action involving said graphical representation or a part thereof with a selection function such that selecting one or more values of a category on said graphical representation results in said graphical representation corresponding to a tier of said data collection including only said data files having said selected category values, whereby said selection function is repeatable for causing said graphical representation to correspond to another tier of said data collection narrower than a previous tier;

said data collection thereafter, being navigable by a user winnowing down the number of data files in said graphical representation in accordance with the category values selected by the user.

6. A computer-implemented apparatus comprising a computer program product embodied in a computer readable storage medium for navigating a data collection according to claim 5, further including:

(a) means for identifying a baseline from which navigation of said data collection commences, said baseline including a data file selected from said data collection;

(b) means for calculating a correlation between said baseline and other data files within said data collection;

(c) means for calculating a correlation between said baseline and other categories within said data collection;

(d) means for providing a data file or category selection based on said respective correlations such that said selection has a relationship with said baseline;

(e) a graphical representation of said data collection;

(f) means for associating a portion of said graphical representation with said selection and associating an action involving said portion of the graphical representation with a function involving the corresponding selection such that said function can be performed by performing a respective action on a corresponding portion of said graphical representation wherein the apparatus enables a first and subsequent selection from a data collection, each selection having a relationship with a preceding selection and being made by performing an action on the relevant corresponding portion of a graphic representation of the data collection.

7. A content delivery apparatus for delivering data from a data collection, the apparatus including:

a. access means for accessing data in a data collection, the access means being operable over a network;

b. delivery apparatus for delivering accessed data from the data collection to a user, the delivery means being operable over a network;

c. a graphical representation of said data collection configured such that at least part of said data collection is viewable by said user over a network;

d. programming instructions embodied in a computer readable non-transitory storage medium in communication with the graphical representation, wherein the programming instructions are performed by a processor and configured to make the accessed data collection navigable by a user as a function of correlations between a plurality of metadata for each data file in said data collection; and correlations between categories of data files, wherein the correlations indicate a relative relationship between any two or more data files in said data collection; any two or more categories in said data collection, and wherein performance by a user of an action on the graphical representation or a relevant part thereof results in performance of a function on a corresponding respective part of said data collection, including the steps of organizing said database for use by said user by (a) analysing metadata regarding each of a plurality of data files in a data collection;

(b) calculating correlations between said metadata of each of said data files and said categories;

(c) for each one of a plurality of said categories, providing a graphical representation of the data files in said data collection grouped by values of said categories;

(d) associating an action involving said graphical representation or a part thereof with a selection function such that selecting one or more values of a category on said graphical representation results in said graphical representation corresponding to a tier of said data collection including only said data files having said selected category values, whereby said selection function is repeatable for causing said graphical representation to correspond to another tier of said data collection narrower than a previous tier;

said data collection thereafter, being navigable by a user narrowing the number of data files in said graphical representation in accordance with the category values selected by the user.

* * * * *